Patented May 16, 1950

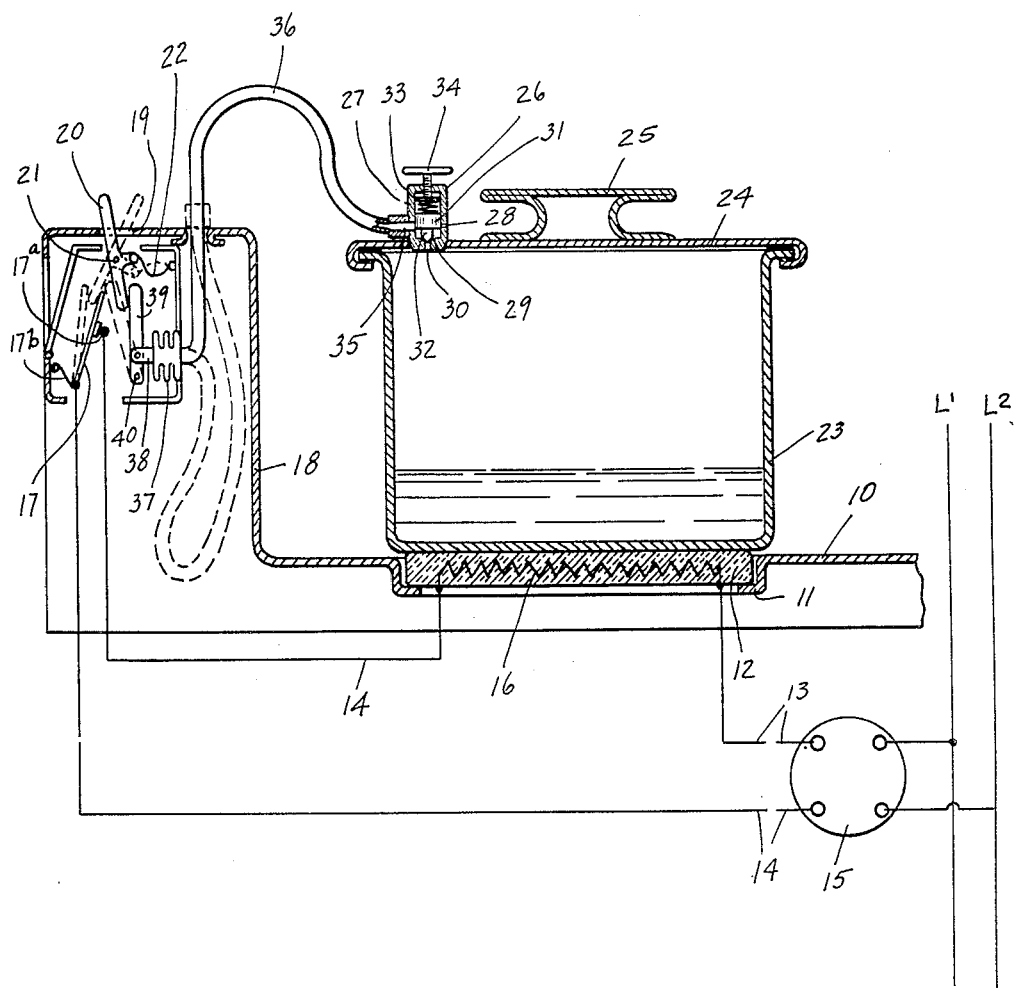

2,507,666

UNITED STATES PATENT OFFICE 2,507,666

PRESSURE COOKING STOVE PROTECTIVE SYSTEM

Robert S. Goldthwaite, Marion, Ind., assignor to The Rutenber Electric Co., Marion, Ind., a corporation Application September 21, 1946, Serial No. 698,543

2 Claims. (Cl. 219—37)

This invention relates to a cook stove and a portable pressure cooker heated thereby.

The chief object of the present invention is to provide a control for discontinuing or reducing the heat supply to the cooker upon attainment of a predetermined pressure therein. This prevents wastage of food due to overcooking and, more importantly, prevents generation of dangerous or excessive pressures.

The chief feature of the present invention resides in providing an excess pressure operable cut-off or control type connection between the portable pressure cooker and the cook stove heat supply, whereby the latter is automatically discontinued under cooker predetermined excessive pressure conditions.

Most cook stoves are of the gas, gasoline, kerosene or electric heat source type and wherein the heat supply to the heating units of such a stove may be turned on or off at will, or manually regulated as by a valve or switch, respectively.

It is only recently that the use of the so-called pressure cooker (especially of the portable pot or pan type) has become widespread. These are usually devoid of sight pressure gauges. Such cooking requires materially less time than conventional non-pressure cooking.

Present directions for the use of such cookers are, when the desired pressure is attained in the cooking vessel, to maintain it for only a relatively short interval thereafter as compared to prior practices.

Longer cooking thus results in overcooking and food waste. Also, longer cooking may result in excessive pressure generation so that an explosion occurs.

As stated, the present invention seeks to eliminate both these possibilities.

Other objects and features of the invention will be set forth more fully hereinafter.

The full nature of the invention will be understood from the accompanying drawings and the following description and claims:

In the drawing there is diagrammatically illustrated in vertical section, as it were, one embodiment of the invention and, more particularly, an electric stove application wherefore switches are herein illustrated, it being understood that for liquid or gaseous fuel, valves would be employed in lieu of switches.

In the drawing 10 indicates the top of an electric stove having opening 11 therein in which is supported a heating unit 12. Current is supplied from lines L1 and L2 to each of the units and by independent lines 13 and 14 controlled by switch 15 usually mounted on the stove front near the top thereof. 16 indicates a diagrammatic representation of a resistance heating unit but the invention is not necessarily restricted thereto.

Included in line 14, for example, is a normally closed switch 17—17a, member 17 being biased to closed position as by spring 17b. This switch is housed or concealed within the back splasher panel 18. Projecting through slot 19 in the top thereof is the toggle operable reset and opening member 20 pivoted at 21 and spring 22 constrained to overcenter positioning.

Member 20 terminates within the panel adjacent the upper end of switch member 17. When member 20 is tilted clockwise, as hereinafter described, it assumes the dotted line position and is held therein by spring 22. At the same time the adjacent end of member 20 tilts switch member 17 counterclockwise from closed circuit to open circuit position and thus holds the switch open in opposition to its constraint 17b.

To close the switch aforesaid it is necessary to manually tilt member 20 counterclockwise to the full line position which releases switch member 17 to its constraint 17b, thus closing the circuit to the heating unit resistance 16.

On the burner unit 12 is supported a vessel type pressure cooker having the main vessel 23 with securely attachable cover 24 with handle knob 25, if desired. This cover includes a relief valve structure 26 comprised of a cylinder 27 with escape port 28, valve seat 29 and valve controlled passage 30.

In the valve structure 26 is a piston valve comprising piston 31 and needle valve 32. Port 28 is of less area than passage 30. This piston bears against load spring 33, the effective force of which is adjusted by external screw 34. The more it is screwed down the higher the pressure must rise in cooker 23 before the piston can oppose and overcome this adjustable load spring.

When such load is overcome the piston and valve rise, thus opening passage 30 fully to the cylinder 27 and the interior thereof to relief port 28 to visually and/or audibly indicate generation of the desired and predetermined pressure in the cooker.

Another port 35 of greater size than port 30 is also thus uncovered by the piston valve. This port communicates with one end of flexible tube 36, the other end of which terminates in a bellows structure 37 and the stationary end thereof. The movable end carries member 38 connected to lever 39 pivoted at 40.

The bellows and lever are concealed within the back splasher panel and juxtapositioned to switch member 17 and toggle member 20 so that, whenever the piston valve is pressure elevated, pressure is applied to the bellows to effect counterclockwise tilting of member 39 so that member 20 is reversely tilted for opening the switch 17—17a.

As will be apparent, pressure application opens only this switch and even if the pressure falls the switch will still be held open by the toggle structure. The switch can only be closed when the pressure has lowered sufficiently to deactivate the bellows and when the reset member 20 has been tilted counterclockwise, as aforesaid.

It is also preferred to provide a ready disconnect connection between conduit 36 and cylinder 27 at port 35. This may take the form of a bayonet type fixture, and same can serve as a finger piece and stop for facilitating conduit withdrawal from the panel interior and preventing full entrance thereto.

From the foregoing it will be apparent that generation of predetermined pressure in the cooker will effect automatic opening of the circuit to the heating unit. Whenever or wherever desired, a time delay device may be interposed between the bellows and member 20 or the capacity of the bellows can be so adjusted that inherent lag of the desired amount is included substantially, or all lag can be eliminated.

Another application of this invention would be to have the pressure switch connected to the cooker through a separate fitting and adjusted so as to cut off the current at the top setting of the pressure relief valve, thus acting only as a safety device should the operator forget to turn off the heat at the proper time.

Still another application would be similar to that described above except that the flexible tubing on the pressure switch would be connected to a separate fitting in the cooker or lid and the switch set so as to disconnect the heating unit at a point below the lowest pressure setting of the relief valve and to construct the heating unit so that the residual heat would raise the pressure to the setting of the relief valve.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a structure comprising an electric range with a manually operable switch, a heating unit controlled by said switch, and a pressure cooker, the combination therewith of a pressure operable cut-out switch in series with the heating unit, and means for transmitting vapor pressure from the cooker to the switch for cut-out purposes, the said means for transmitting vapor pressure including a pressure relief valve carried by the cooker, a pressure responsive element carried by the stove, and conduit means connecting the relief valve and the stove carried means, the stove having a back panel splasher structure wherein the pressure responsive means is housed and an aperture through which the conduit means can freely pass, the same being storable in concealed relation by said panel and having detachable connection with the relief valve of the cooker, said relief valve including three ports, one open to the atmosphere and of lesser area than the other two, one communicating with the cooker interior and the other communicating with the conduit means, the piston and valve normally closing all three ports, and when cooker pressure actuated normally opening all three ports.

2. Structure as defined by claim 1 wherein there is provided manually adjustable load spring means for varying the load upon the piston valve for selective actuation of that valve at the selected pressure determined by that loading when such pressure is generated in said cooker.

ROBERT S. GOLDTHWAITE.

REFERENCES CITED

The following references are of record in the file of this patent:

UNITED STATES PATENTS

| Number | Name | Date |
| --- | --- | --- |
| 1,756,787 | Goughnour | Apr. 29, 1930 |
| 1,931,190 | Goughnour | Oct. 17, 1933 |
| 2,308,603 | Graham | Jan. 19, 1943 |
| 2,392,077 | Wilson | Jan. 1, 1946 |
| 2,392,635 | Bletz | Jan. 8, 1946 |
| 2,424,393 | Graves | July 22, 1947 |
| 2,440,128 | Sullivan | Apr. 20, 1948 |